United States Patent
Burnett et al.

(10) Patent No.: US 9,691,082 B1
(45) Date of Patent: Jun. 27, 2017

(54) SYSTEMS, DEVICES, AND METHODS FOR PROVIDING A DYNAMIC SUBSCRIPTION UPDATE FEATURE IN A WIRELESS COMMUNICATIONS NETWORK

(75) Inventors: Leonard Burnett, Marietta, GA (US); LiSuan Poh, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 936 days.

(21) Appl. No.: 12/051,184

(22) Filed: Mar. 19, 2008

(51) Int. Cl.
*G06Q 30/02* (2012.01)

(52) U.S. Cl.
CPC ................. *G06Q 30/0255* (2013.01)

(58) Field of Classification Search
CPC ..................................... G06Q 30/02
USPC ........................................... 705/14
See application file for complete search history.

(56) References Cited

U.S. PATENT DOCUMENTS 5,794,142 A * 8/1998 Vanttila et al. ............... 455/419
6,959,182 B2 * 10/2005 Lingafeldt et al. ........... 455/405
2003/0145316 A1 * 7/2003 McKinlay et al. ........... 717/173
2007/0281669 A1 * 12/2007 Jiang ....................... H04M 3/44
455/414.1
2009/0054030 A1 * 2/2009 Golds ..................... H04M 15/00
455/406

FOREIGN PATENT DOCUMENTS

WO WO 2008/080139 A1 * 7/2008 .............. H04J 3/14

* cited by examiner

*Primary Examiner* — Amanda Abrahamson
*Assistant Examiner* — Michael Stibley
(74) *Attorney, Agent, or Firm* — Hartman & Citrin LLC

(57) ABSTRACT

Systems, devices, and methods for providing a dynamic subscription update feature in a wireless communications network are disclosed herein. An exemplary system for providing a dynamic subscription update feature in a wireless communications network is configured to receive offline data and in-call data from a plurality of network entities for use in determining, in accordance with one or more rules, whether at least one subscriber is eligible to receive a subscription update offer and receive a response message indicating whether the at least one subscriber accepts or declines the offer. A device configured to receive a subscription update offer and respond with an acceptance or decline message is disclosed. Methods for operating the aforementioned system and device are also disclosed.

21 Claims, 5 Drawing Sheets

SYSTEMS, DEVICES, AND METHODS FOR PROVIDING A DYNAMIC SUBSCRIPTION UPDATE FEATURE IN A WIRELESS COMMUNICATIONS NETWORK

TECHNICAL FIELD

The present application relates generally to wireless communications networks, and more particularly, to systems, devices, and methods for providing a dynamic subscription update feature in a wireless communications network.

BACKGROUND

Subscribers of wireless communication services agree to service with a wireless service provider for a length of time. Most often, the subscriber's obligation is to maintain service with the wireless service provider during the specified time. In some instances, the wireless service provider may require a minimum service level for the length of the obligation.

Wireless service providers offer many services including voice, data, and messaging services. Service providers typically offer several voice plans with varying minute amounts and several data plans with varying data transfer limits including unlimited data. Service providers also typically offer messaging packages for text message, multimedia message, and instant message, for example.

A subscriber may be allowed to upgrade or downgrade a service plan, or may be restricted to only upgrading the service plan during the obligation. If a subscriber is allowed to upgrade or downgrade, the subscriber can call a customer service representative or access the service provider's website to request the change, for example. Changes may be prorated or may be activated at the beginning of the next billing cycle.

As such, a subscriber often must choose a service plan based upon the number of minutes or the data usage the subscriber predicts he or she will utilize during any given month. This is difficult to accurately predict and often results in the subscriber being charged with overage fees for minutes or data transfer beyond that specified under their service plan. Additionally, a service provider may benefit from offering to upgrade or downgrade a subscriber's service plan based upon subscriber history and subscriber usage data acquired from various network entities.

SUMMARY

Accordingly, systems, devices, and methods are taught herein for providing a dynamic subscription update feature in a wireless communications network.

A first aspect of the present application is a system for providing a dynamic subscription update feature in a wireless communications network. The system includes a processor and a memory, wherein the memory is in communication with the processor and is configured to store at least one rule for use by the processor to determine whether or not at least one subscriber is eligible to receive a subscription update offer based upon input data received via an input and output module. The input and output module is configured to receive offline data from a first set of network entities; receive in-call data from a second set of network entities; and send the subscription update offer to a destination.

Another aspect includes a method for providing a dynamic subscription update feature to a subscriber device in a wireless communications network. The method includes receiving offline data from a first set of network entities; receiving in-call data from a second set of network entities; evaluating the offline data and the in-call data to determine if at least one subscriber is eligible to receive a subscription update offer based upon at least one rule; generating the subscription update offer; sending the subscription update offer to a destination; receiving a response message in response to the subscription update offer, wherein the response message indicates whether a subscriber accepted or declined the subscription update offer; and updating subscription information for the at least one subscriber if the response message identifies that the at least one subscriber has accepted the subscription update offer. The method can further include generating a confirmation message to confirm receipt of the response message; and sending the confirmation message to the destination.

In the aforementioned system and method, the first set of network entities can include at least one of a subscriber database, a billing system, a rating system, a mediation system, a fraud system, and a customer care system. The second set of network entities can include at least one of a Signaling System #7 (SS7) application, a Gateway GPRS Support Node (GGSN), and a content gateway.

In the aforementioned system and method, the destination is a subscriber device. In another embodiment, the destination is one of a Short Message Service Center (SMSC), a Multimedia Messaging Service Center (MMSC), and an email server.

Yet another aspect includes a device. The device includes a communications component configured to receive a subscription update offer; a display to present the subscription update offer to a user; an input interface configured to receive an input indicative of whether the user requests to accept or decline the subscription update offer; a processor; and a memory, in communication with the processor, configured to store an application that is configured to generate a response message that includes the input indicating whether the user requests to accept or decline said subscription update offer.

Another aspect includes a method for operating the device. The method includes receiving a subscription update offer; presenting an option to accept or decline the subscription update offer; receiving an input indicative of whether a user requests to accept or decline the subscription update offer; and generating a response message that includes the input indicating whether the user requests to accept or decline the subscription update offer.

In the systems, methods, and devices summarized above, the subscription update offer can include an up-sell offer, a down-sell offer, or a cross-sell offer. The subscription update offer can include a data subscription update offer.

DETAILED DESCRIPTION

As required, detailed embodiments of the present application are disclosed herein. It must be understood that the disclosed embodiments are merely exemplary examples of the application that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present application. Therefore, specific structural and functional details disclosed herein are not to be interpreted as limiting, but merely as a basis for the claims and as a representative basis for teaching one skilled in the art to variously employ the present application.

Figure 1:
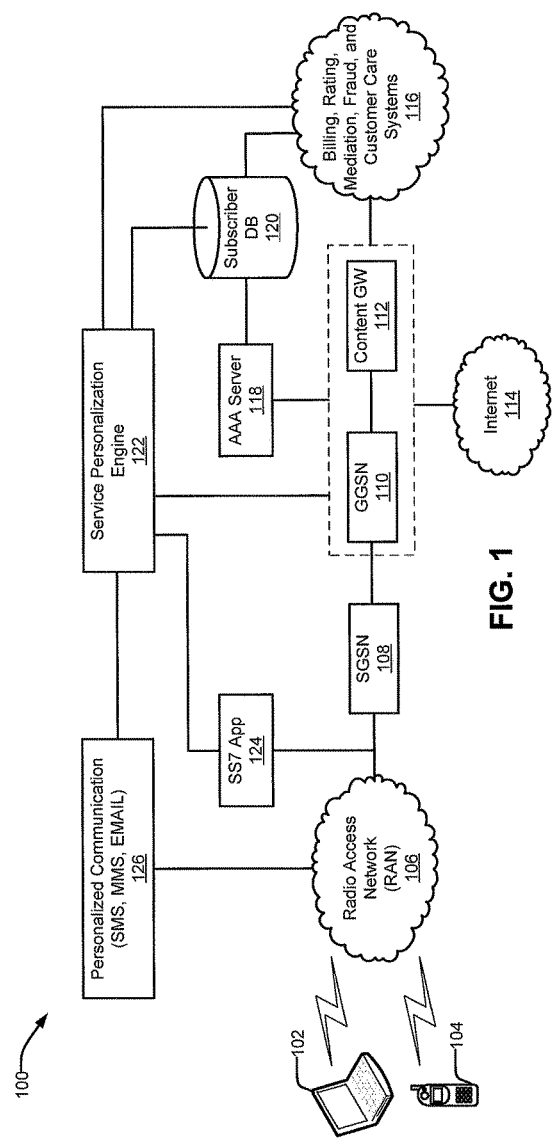
FIG. 1 illustrates a block diagram of an exemplary wireless communications network in accordance with an embodiment of the present application.

Referring now to the drawings wherein like numerals represent like elements throughout the several views, FIG. 1 illustrates a block diagram of an exemplary wireless communications network 100 in accordance with an embodiment of the present application. The wireless communications network 100 is configured to provide voice and data services for a plurality of network subscribers. An aspect of the present application provides a dynamic subscription update feature for subscription services provided by the wireless communications network 100. The dynamic subscription update feature can include a service up-sell, a service cross-sell, or service down-sell of voice and/or data service provided by the wireless communications network 100. The wireless communications network 100 can operate in accordance with any mobile communications standard or proprietary technology. By way of example, the wireless communications network 100 can be configured as a 2G GSM (Global System for Mobile communications) network and provide data communications via GPRS (General Packet Radio Service), and EDGE (Enhanced Data rates for GSM Evolution). By way of further example, the wireless communications network 100 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 100 is also compatible with future mobile communications standards including, but not limited to, pre-4G and 4G, for example.

The illustrated wireless communications network 100 includes a wireless data device 102 and a mobile communications device 104, both of which are illustrated as being in communication with a radio access network (RAN) 106. The wireless data device 102 can be a computer, such as a laptop computer or handheld computer configured with data access hardware (e.g., a data access card) for accessing data services provided by the wireless communications network 100. The mobile communications device 104 can be a voice and data device, such as a cellular telephone or smartphone, for example. The wireless data device 102 and the mobile communications device 104 are both configured to access the wireless communications network 100 via any mobile communications standard as described above. Accordingly, the RAN 106 is configured in accordance with the appropriate standard specification as is known in the art.

The illustrated wireless communications network 100 further includes a GPRS core network including an SGSN (Serving GPRS Support Node) 108 and a GGSN (Gateway GPRS Support Node) 110 that can each support the GPRS tunneling protocol, for example. The RAN 106 is in direct communication with the SGSN 108. The SGSN 108 is in communication with the GGSN 110. The SGSN 108 provides location tracking for the devices 102, 104 and performs security functions and access control. The GGSN 110 provides the edge routing function for the GPRS core network. The GGSN 110 performs IP router functions, firewall functions and filtering functions. The GGSN 110 is illustrated as being in communication with a content gateway 112. The GGSN 110 and the content gateway 112 are illustrated as being in communication with the Internet 114. The content gateway 112 is configured to receive and store content from content providers and provide the content to wireless network subscribers that are authorized to receive the content. The GGSN 110 can include the functionality of the content gateway 112 and in effect may be one and the same entity.

The GGSN 110 and content gateway 112 are in communication with various other network systems and platforms. Specifically, the GGSN 110 and content gateway 112 are illustrated as being in communication with various network systems illustrated as a network cloud 116. The GGSN 110 and content gateway 112 are also illustrated as being in communication with an AAA (Authentication Authorization Accounting) server 118 that, in turn, is illustrated as being in communication with a subscriber database 120. The subscriber database 120 is illustrated as being in communication with the network cloud 116 and a service personalization engine 122. The service personalization engine 122 is illustrated as being in communication with an SS7 (Signaling System #7) application 124 and a personalized communication module 126. The various systems and platforms are now described in detail.

The network cloud 116 can include a billing system suite for providing billing, rating, and mediation functions, a fraud system, and a customer care system. The billing system suite can include a billing system for providing billing functions, a rating system for providing rating functions, and a billing mediation system for providing billing mediation functions.

The rating system can be configured to receive details of a voice or data session and determine the monetary cost of the session. Pricing for the various subscription and add-on services offered by a wireless service provider can be adapted by the rating system to reflect changing pricing policies.

The billing system can be configured to provide support for all billing related activities for a service provider including creating and sending electronic or paper bills to subscribers. If a subscriber's account is updated such that the user's subscription service is upgraded or downgraded, the billing system can be updated accordingly to reflect the new billing information for the subscriber's account.

The billing mediation system can be configured to adapt the billing system to the addition of new services and modifications of existing services.

The fraud system can include, for example, a fraud database configured to flag suspected fraudulent users and/or users with a history of fraudulent activity. The fraud database can be further configured to report fraudulent activity to the other network systems to suspend or terminate the fraudulent user's account.

The customer care system can be a telephone-based or Internet-based customer care system for providing customer support for hardware, software, account, and subscription service related issues.

An AAA (Authentication Authorization Accounting) server 118 is also illustrated. The AAA server 118 is a network server used for access control. Authentication identifies the user. Authorization implements policies that determine which resources and services a valid user may access. Accounting keeps track of time and data resources used for billing and analysis. The AAA server 118 can use RADIUS or DIAMETER protocol, for example.

The subscriber database 120 can be configured to store subscriber information such as the information provided when an account is established. As such, subscriber information can include, but is not limited to, contract information, device information, credit information, account standing, address information, telephone number, email address, and like information, for example.

The service personalization engine 122 can be configured to receive information from the GGSN 110, the content gateway 112, the subscriber database 120, the network cloud 116, and the SS7 application 124 as inputs to use in determining whether or not a subscriber is eligible to receive an offer to update, that is to upgrade or downgrade, one or more service subscriptions based upon the subscriber's usage and history. The service personalization engine 122 is described in further detail with reference to FIG. 2.

The service personalization engine 122 can provide a subscription update offer to the personalized communication module 126. The personalized communication module 126 can generate and send the offer to the subscriber's device 102, 104 via the RAN 106. The personalized communication module 126 is a module with interfaces to an SMSC (Short Message Service Center), MMSC (Multimedia Messaging Service Center), or an email server. In an alternative embodiment, the personalized communication module 126 can be an SMSC, a MMSC, or an email server. In another alternative embodiment, the service personalization engine 122 includes the hardware and software to generate and send the offer to the subscriber's device 102, 104 as an SMS, MMS, or email message, for example. Other messaging types are contemplated.

The SS7 application 124 is a layer 7 application for intercepting SS7 messages from STPs (Signal Transfer Points). By intercepting SS7 messages, the SS7 application 124 can detect attach requests and detect the network to which the subscriber's device is attempting to attach. Detecting to which network the subscriber's device is attempting to attach can be used to reroute an attach request to a partner network that, for example, is less expensive for the service provider. The SS7 application 124 can provide this information to the service personalization engine 122 as a factor to consider for analysis in determining if a subscriber is eligible to receive a subscription update offer.

Figure 2:
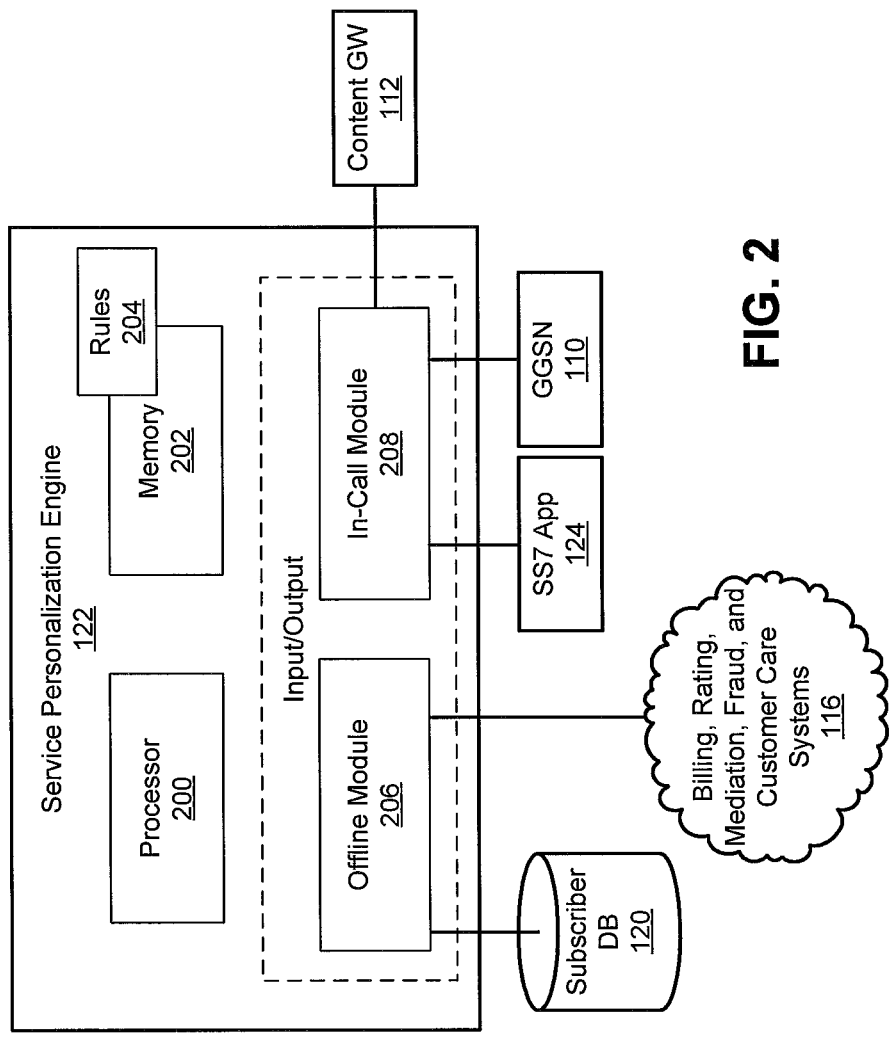
FIG. 2 illustrates a block diagram of an exemplary service personalization engine in accordance with an embodiment of the present application.

Referring now to FIG. 2, a block diagram of an exemplary service personalization engine 122 is illustrated in accordance with an embodiment of the present application. The illustrated service personalization engine 122 can include a processor 200 and memory 202. The processor 200 is configured for processing instructions stored in the memory 202. The memory 202 can include a plurality of rules 204 implemented as software for use in determining whether or not a subscriber is eligible to receive a subscription update offer in accordance with aspects of the present application.

The rules 204 can be defined by the service provider. In one embodiment, the rules 204 are defined for each subscriber. In another embodiment, the rules 204 are defined for a group of subscribers; for example, subscribers with like subscriptions. In yet another embodiment, the rules 204 are defined for subscribers that exhibit like usage, for example, over a specified period of time. In another embodiment, the rules 204 can define roaming rules that can be used to identify subscribers that frequently roam on a partner network. Roaming charges may be significantly more expensive for the service provider and accordingly subscribers that frequently roam may be excluded from an update offer. In another embodiment, the rules 204 are defined for all subscribers, a group of subscribers, or individual subscribers based upon business needs defined by the service provider. Promotions and other discounts, such as packages including multiple subscription services may influence the service provider's rules. In another embodiment, the rules 204 can be configured to exclude subscribers that currently or historically were associated with fraudulent activity. In yet another embodiment, the rules 204 can include an opt-out rule. If a subscriber chooses to opt-out of the update feature described herein, then that subscriber will not receive an update offer.

The rules 204 are not limited to those described above. The rules 204 may be different for every service provider that implements the service personalization engine 122 in accordance with the present application. The business requirements for each service provider may vary greatly. It should be understood that other rules 204 are contemplated.

The illustrated service personalization engine 122 can further include an offline I/O module 206 and an in-call I/O module 208. The offline I/O module 206 can receive inputs from the subscriber database 120 and the network cloud 116, for example. The information provided by these entities is provided offline. Offline can be described as a scenario in which the service personalization engine 122 is not actively monitoring service usage of one or more subscribers. Offline information can include historical information regarding a subscriber's historical usage, personal information, device information, contract information, fraud history, account standing, and like information.

The in-call I/O module 208 can receive inputs from the SS7 application 124, the GGSN 110 and the content gateway 112, for example. The information provided by these entities is provided during in-call monitoring. In-call monitoring can be described as a scenario in which the service personalization engine 122 is actively monitoring current service usage of one or more subscribers. In-call monitoring can include monitoring the destination IP address and IP port, and/or monitoring SS7 messages, for example.

Figure 3:
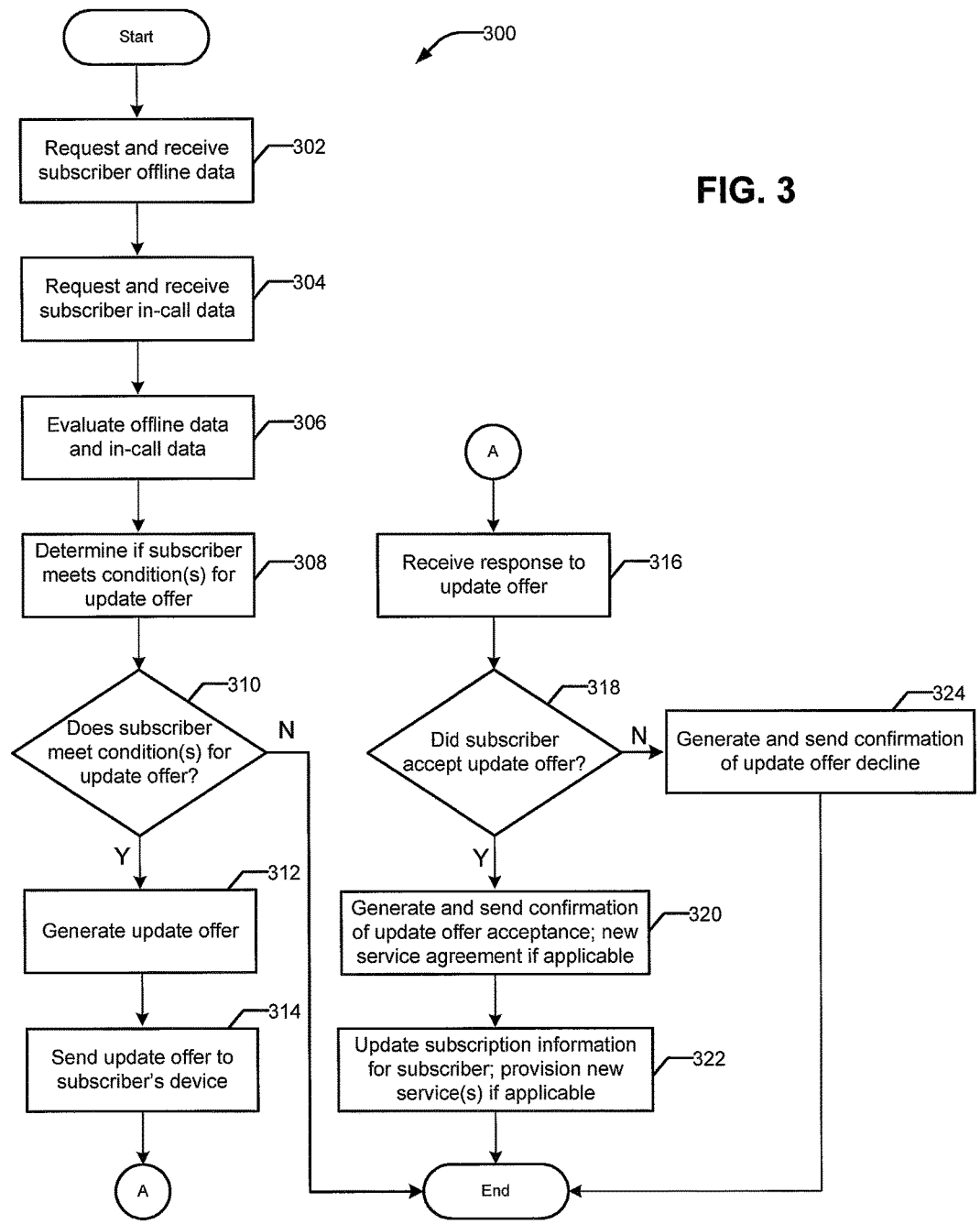
FIG. 3 illustrates a flow diagram of a method for providing a dynamic subscription update feature from the perspective of the exemplary personalization engine in accordance with an embodiment of the present application.

Referring now to FIG. 3, a flow diagram of a method 300 for providing a dynamic subscription update feature from the perspective of the exemplary personalization engine is illustrated in accordance with an embodiment of the present application. It should be understood that the steps described are not necessarily presented in any particular order and performance of some or all the steps in an alternative order is possible and contemplated. The steps have been presented in the demonstrated order for ease of description and illustration. Steps can be added, omitted, and/or performed simultaneously without departing from the scope of the appended claims. Some or all steps of this process, and/or substantially equivalent steps, can be performed by execution of computer-readable instructions included on a computer-readable medium, such as, a memory 202, for example.

The method 300 begins and flow proceeds to step 302 wherein the service personalization engine 122 sends a request for offline data, such as subscriber data, contract data, device data, billing data, rating data, mediation data, fraud data, and customer care data provided by the subscriber database 120 and the network cloud 116. The service personalization engine 122 can be configured to request offline data once, as needed, or at specified intervals, for example. In addition or alternatively, the subscriber database 120 and the systems of the network cloud 116 can be configured to send the offline data to the service personalization engine 122 as updated data is received, or at a random or specified interval. The offline data is stored for each subscriber being considered for an update offer in the memory 202 of the service personalization engine 122.

Flow of the illustrated method 300 then proceeds to step 304 wherein the service personalization engine 122 performs in-call monitoring by requesting in-call data, such as intercepted SS7 messages, destination IP addresses, destination IP ports, and session data (e.g., length, bytes sent, bytes received, etc.) provided by the SS7 application 124, the GGSN 110, and the content gateway 112. The service personalization engine 122 can be configured to perform the evaluation of offline data and in-call data for multiple subscribers at a time. The subscribers can each be associated with a set of rules 204, associated with a set of rules 204 by group, or all subscribers can be associated with the same set of rules 204.

The method 300 continues at step 306 wherein the offline data and in-call data is evaluated. At step 308, the service personalization engine 122 determines if a subscriber meets the condition(s) for an update offer as specified by the rules 204. An update offer can be personalized for an individual subscriber, a group of subscribers, or all subscribers based upon the offline data and in-call data received for the subscriber(s).

An update offer can include an up-sell offer whereby the service provider attempts to persuade the subscriber to purchase additional services, upgrades, or add-on services for the mutual benefit of the subscriber and the service provider or for the exclusive benefit of either party. An update offer can also include a down-sell offer whereby the service provider offers to cancel services or downgrade services for the mutual benefit of the subscriber and the service provider or for the exclusive benefit of either party. An update offer can also include a cross-sell offer whereby the service provider offers related or suggested services to the subscriber for the mutual benefit of the subscriber and the service provider or for the exclusive benefit of either party.

At step 310, it is determined if the subscriber meets the conditions for an update offer as specified by the rules 204. If the subscriber does meet the conditions, the method 300 proceeds to step 312. At step 312, the service personalization engine 122 generates an update offer. The service personalization engine 122 can be configured to format the update offer or provide the update offer as unformatted data to the personalized communication module 126, an SMSC, an MMSC, an email server, or other messaging platform for formatting. At step 314, the service personalization engine 122, the personalized communication module 126, an SMSC, an MMSC, an email server, or other messaging platform can be configured to send the formatted message to the subscriber's device 102, 104.

The method 300 then proceeds to step 316 wherein the service personalization engine 122 receives a response to the update offer. The response can be received directly at the service personalization engine 122 or received at the personalized communication module 126, an SMSC, an MMSC, an email server, or other messaging platform and forwarded to the service personalization engine 122. It is determined, at step 318, if the subscriber accepted the update offer. If the subscriber accepted the offer, the service personalization engine 122 can generate and send a confirmation message to the subscriber's device 102, 104 confirming the subscriber's request to accept the update offer, at step 320. In some instances, the acceptance of an update offer can trigger the need for a new or amended service agreement (contract). Accordingly, the confirmation message can include a new or amended service agreement in a format appropriate for the subscriber to view and accept using their device or a computer with Internet access. The service personalization engine 122 can alternatively or additionally send a message to the network cloud 116 instructing the appropriate entity to prepare a paper service agreement to be sent via mail to the subscriber. An information package describing the subscriber's updated services can also be sent in electronic or paper form.

The method 300 then proceeds to step 322 wherein the subscriber's subscription information is updated and any new service, upgraded service, or downgraded service is provisioned for the subscriber and the method 300 ends.

If the subscriber does not accept the update offer at step 318, the service personalization engine 122 can generate and send a confirmation message to the subscriber's device 102, 104 confirming the subscriber's request to decline the update offer, at step 324, and the method 300 ends. If the subscriber does not meet the condition(s) for an update offer at step 310, the method 300 ends and the subscriber is not sent an update offer.

A real-world example of the aforementioned method 300 is now described. By way of example, suppose a subscriber "Bill" currently subscribes to a 5 MB per month data plan that allows Bill to send and receive data inclusive of a 5 MB limit. If Bill exceeds the 5 MB limit in any given month, Bill is charged data overage fees for the excess usage for that month. By way of further example, suppose Bill frequently exceeds his 5 MB data limit and always pays his account on time regardless of the overage fees. Accordingly, the service personalization engine 122 can use Bill's usage information to suggest, via an update offer, that Bill upgrade his plan to unlimited data to prevent future overage fees and remove the 5 MB limit.

Figure 4:
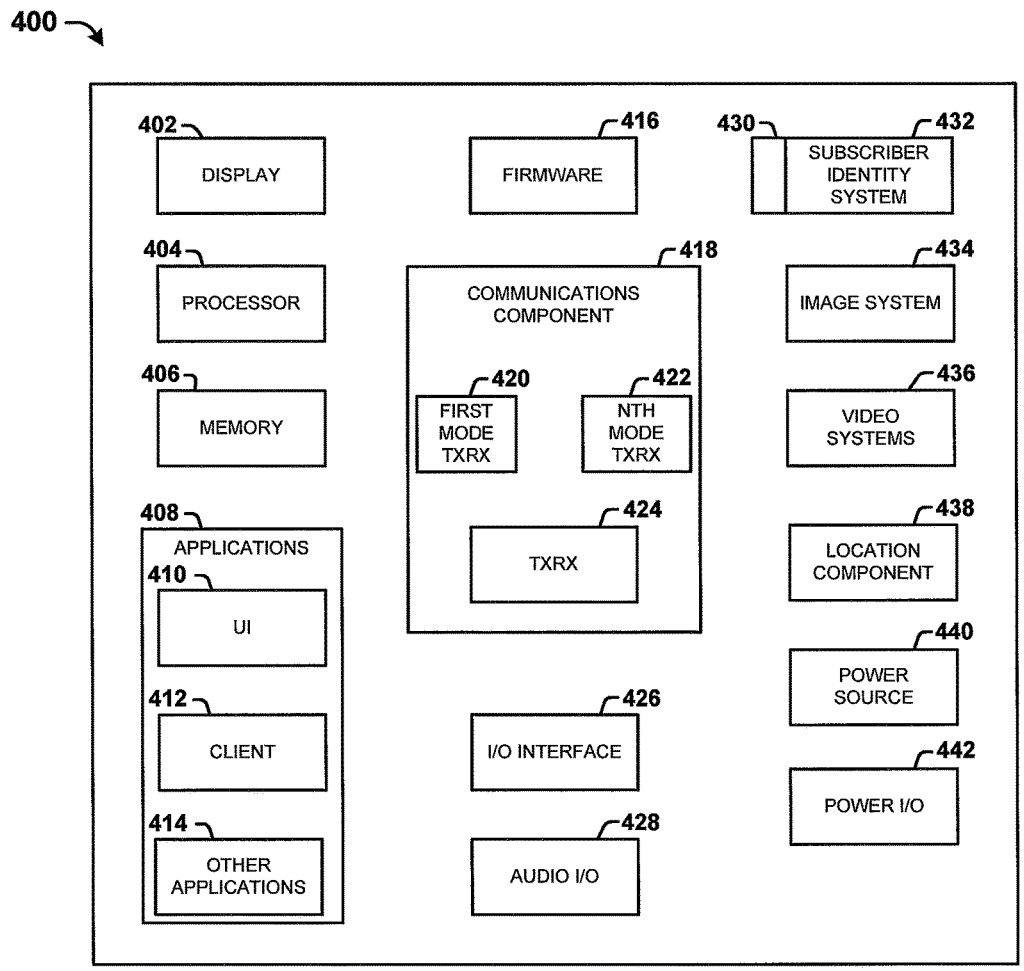
FIG. 4 illustrates a block diagram of an exemplary subscriber device.

Referring now to FIG. 4, a block diagram illustrating various components of an exemplary subscriber device 400 is shown, according to the present application. Although no connections are shown between the components illustrated and described in FIG. 4, the components can interact with each other to carry out device functions.

As illustrated, the subscriber device 400 can be a single-mode or multi-mode mobile communications device 102 or a wireless data device 104. FIG. 4 and the following discussion are intended to provide a brief, general description of a suitable environment in which the various aspects of an embodiment of the present application can be implemented. While the description includes a general context of computer-executable instructions, the present application can also be implemented in combination with other program modules and/or as a combination of hardware and software. Particular processes carried out by the subscriber device 400 and components in communication with the subscriber device 400 are described in greater detail with reference to FIG. 5. These processes can be carried out via applications stored within a memory on the subscriber device 400.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 400 includes a display 402 for displaying multimedia such as, for example, text, images, video, telephony functions, caller line ID data, setup functions, menus, messages, wallpaper, graphics, and the like. The device 400 also includes a processor 404 for controlling and/or processing data. A memory 406 can interface with the processor 404 for the storage of data and/or applications 408. The memory 406 can include a variety of computer readable media including, but not limited to, volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD-ROM, DVD, or other optical disk storage, magnetic tape, magnetic disk storage, other magnetic storage devices, or any other medium that can be used to store the desired information and that can be accessed by the device 400.

The memory 406 can be configured to store one or more applications 408, such as, for example, user feedback component software for accepting or declining update offers. The applications 408 can also include a user interface (UI) application 410. The UI application 410 can interface with a client 412 (e.g., an operating system) to facilitate user interaction with device functionality and data, for example, answering/initiating calls, entering/deleting data, configuring settings, address book manipulation, multi-mode interaction, responding to update offers, and the like. The applications 408 can include other applications 414 such as, for example, add-ons and plug-ins, as well as subsystems and/or components used to support various service provider services. Other applications 414 can also include a subscription update application to accept or decline a subscription update offer. The subscription update application can utilize SMS, MMS, email, or other messaging types to generate and send a response message in response to a subscription update offer. The applications 408 can be stored in the memory 406 and/or in a firmware 416, and can be executed by the processor 404. The firmware 416 can also store code for execution during initialization of the device 400.

A communications component 418 can interface with the processor 404 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 418 can also include a multi-mode communications subsystem for providing cellular communications via different cellular technologies. For example, a first cellular transceiver 420 can operate in one mode, for example, GSM, and an Nth transceiver 422 can operate in a different mode, for example WiFi. While only two transceivers 420, 422 are illustrated, it should be appreciated that a plurality of transceivers can be included. The communications component 418 can also include a transceiver 424 for unlicensed RF communications using technology such as, for example, WiFi, WiMAX, near-field communications, other RF and the like. The transceiver 424 can also be configured for line-of-sight technologies, such as, infrared and IRDA, for example. Although a single transceiver 424 is illustrated, multiple transceivers for unlicensed RF and line-of-sight technologies are contemplated.

The communications component 418 can also facilitate communications reception from terrestrial radio networks, digital satellite radio networks, Internet-based radio services networks, combinations thereof, and the like. The communications component 418 can process data from a network, such as, for example, the Internet, a corporate WAN, an intranet, a home broadband network, and the like, via an ISP, DSL provider, or other broadband service provider.

An input/output (I/O) interface 426 can be provided for input/output of data and/or signals. The I/O interface 426 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, multi-touch screen, touch pad, trackball, joy stick, controller, monitor, display, LCD, plasma, OLED, combinations thereof, and the like.

Audio capabilities can be provided by an audio I/O component 428 that can include a speaker (not shown) for the output of audio signals and a microphone (not shown) to collect audio signals.

The device 400 can include a slot interface 430 for accommodating a subscriber identity system 432, such as, for example, a SIM or universal SIM (USIM). The subscriber identity system 432 instead can be manufactured into the device 400, thereby obviating the need for a slot interface 430.

The device 400 can include an image capture and processing system 434. Photos and/or videos can be obtained via an associated image capture subsystem of the image system 434, for example, a camera. The device 400 can also include a video systems component 436 for processing, recording, and/or transmitting video content.

A location component 438 can be included to send and/or receive signals, such as, for example, GPS data, assisted GPS data, triangulation data, combinations thereof, and the like. The device 400 can use the received data to identify its location or can transmit data used by other devices to determine the device 400 location. For example, when a customer enters a store with the mobile device 400, the location component 438 can communicate with various sensors within the store to determine the customer's position. The customer's position can then be displayed in a map on the display 402.

The device 400 can include a power source 440 such as batteries and/or other power subsystem (AC or DC). The power source 440 can be single-use, continuous, or rechargeable. In the case of the latter, the power source 440 can interface with an external power system or charging equipment via a power I/O component 442.

Figure 5:
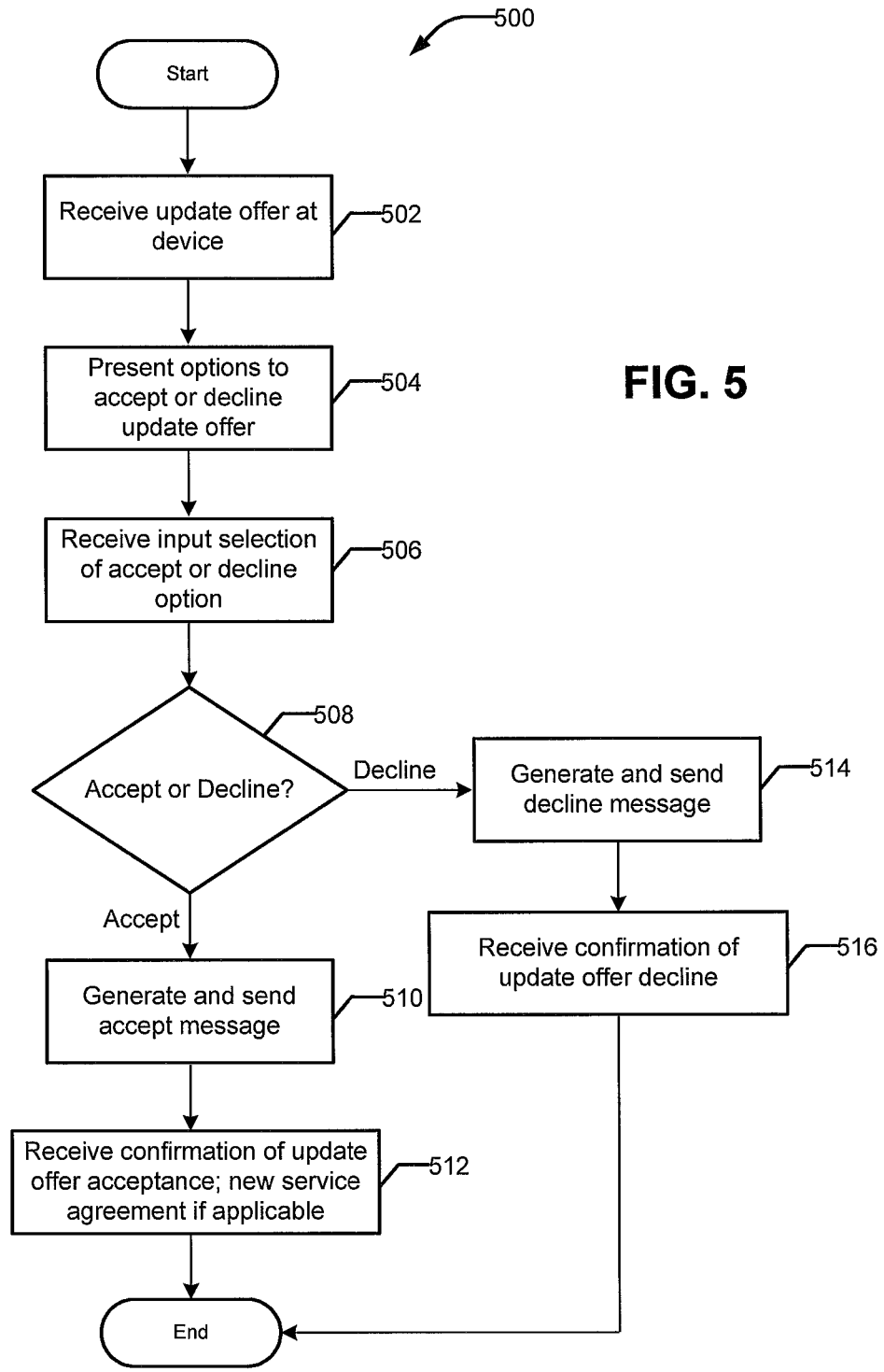
FIG. 5 illustrates a flow diagram of a method for providing a dynamic subscription update feature from the perspective of a subscriber device in accordance with an embodiment of the present application.

Referring now to FIG. 5, a method for providing a dynamic subscription update feature from the perspective of a subscriber device 400 is illustrated in accordance with an embodiment of the present application. It should be understood that the steps described are not necessarily presented in any particular order and performance of some or all the steps in an alternative order is possible and contemplated. The steps have been presented in the demonstrated order for ease of description and illustration. Steps can be added, omitted, and/or performed simultaneously without departing from the scope of the appended claims. Some or all steps of this process, and/or substantially equivalent steps, can be performed by execution of computer-readable instructions included on a computer-readable medium, such as, a memory 406, for example.

The method 500 begins and flow proceeds to step 502 wherein the device 400 receives an update offer from the service personalization engine 122. As described above, the update offer can be sent as an SMS message, an MMS message, an email message, or another message type. At step 504, the update offer can be presented to the user with options to accept or decline the update offer. Alternatively, the update offer can include one or more telephone numbers that can be used to contact a customer service representative to further explain the update offer and/or receive the subscriber's acceptance or decline of the update offer. A website can additionally or alternatively be provided. Additionally, an opt-out function can be provided whereby the user can select to opt-out of future update offers.

The method 500 then proceeds to step 506 wherein the device 400 receives the subscriber's selection to accept or decline the update offer. At step 508, it is determined whether the subscriber accepted or declined the update offer. If the subscriber accepts the update offer, the device 400 generates an accept message, at step 510, that is sent to the service personalization engine 122. In response to the accept message, the device 400 can receive a confirmation message from the service personalization engine 122 confirming that the subscriber has accepted the update offer, at step 512. If applicable, a new or amended service agreement can also be received. The method ends.

If, however, at step 508, the subscriber declines the update offer, the device 400 generates a decline message that is sent to the service personalization engine 122 at step 514. In response to the decline message, the device 400 can receive a confirmation message from the service personalization engine 122 confirming that the subscriber has declined the update offer, at step 516. The method ends. Although not illustrated, an opt-out option can additionally be presented to the user. If the user desires to opt-out of future update offers, the user can select the opt-out option and the device 400 can accordingly generate an opt-out message than can be sent to the service personalization engine 122.

The law does not require and it is economically prohibitive to illustrate and teach every possible embodiment of the present claims. Hence, the above-described embodiments are merely exemplary illustrations of implementations set forth for a clear understanding of the principles of the application. Variations, modifications, and combinations may be made to the above-described embodiments without departing from the scope of the claims. All such variations, modifications, and combinations are included herein by the scope of this disclosure and the following claims.

What is claimed is:

1. A system comprising:
    a network entity configured to
        intercept messages from a signal transfer point,
        detect, from the messages, which network a device is attempting to attach to, and
        provide, to a service personalization engine, roaming information based on detecting to which network the device is attempting to attach; and
    the service personalization engine comprising
        an input and output device configured to receive the roaming information from the network entity,
        a processor, and
        a memory storing instructions that, when executed by the processor, cause the processor to perform operations comprising:
            receiving historical data usage information associated with a subscriber and information indicating a payment history associated with an account of the subscriber, the historical data usage information indicating an amount of data, provided via a wireless communication network, that is accessed by the subscriber over each of a plurality of periods of time,
            receiving, from the network entity, via the input and output device, the roaming information indicating a frequency that the device associated with the subscriber requests attachment to a partner network,
            determining, based at least on the historical data usage information, that the subscriber exceeds, during each of the plurality of periods of time, a data limit associated with a service plan selected by the subscriber,
            determining, based at least on the information indicating the payment history associated with the account of the subscriber, that the subscriber pays fees associated with the account by a time limit associated with the account, and
            based on the frequency that the device associated with the subscriber requests attachment to a partner network, a determination that the subscriber exceeds the data limit associated with the service plan selected by the subscriber during each of the plurality of periods of time, and a determination that the subscriber pays fees associated with the account by the time limit associated with the account, sending a subscription update offer to the device associated with the subscriber.

2. The system of claim 1, wherein the subscription update offer comprises an up-sell offer.

3. The system of claim 1, wherein the subscription update offer comprises a down-sell offer.

4. The system of claim 1, wherein the subscription update offer comprises a cross-sell offer.

5. The system of claim 1, wherein the subscription update offer comprises a data subscription update offer.

6. The system of claim 1, wherein the operations further comprise:
    receiving, from the device associated with the subscriber, a response to the subscription update offer, wherein the response accepts the subscription update offer; and
    in response to the response accepting the subscription update offer,
        generating a confirmation message, and
        sending the confirmation message to the device associated with the subscriber, wherein the confirmation message confirms that the subscriber accepts the subscription update offer.

7. The system of claim 6, wherein the confirmation message comprises an amended service agreement for acceptance by the subscriber.

8. The system of claim 7, wherein the operations further comprise provisioning, for the subscriber, an upgraded service associated with the subscription update offer.

9. A method comprising:
    receiving, by a service personalization engine, historical data usage information associated with a subscriber and information indicating a payment history associated with an account of the subscriber, the historical data usage information indicating an amount of data, provided via a wireless communication network, that is accessed by the subscriber over each of a plurality of periods of time;

intercepting, by a network entity, messages from a signal transfer point;

detecting, by the network entity, from the messages, which network a device is attempting to attach to;

providing, by the network entity, to the service personalization engine, roaming information based on detecting to which network the device is attempting to attach;

receiving, by an input and output device of the service personalization engine, from the network entity, the roaming information indicating a frequency that the device associated with the subscriber requests attachment to a partner network;

determining, by the service personalization engine, based at least on the historical data usage information, that the subscriber exceeds, during each of the plurality of periods of time, a data limit associated with a service plan selected by the subscriber;

determining, by the service personalization engine, based at least on the information indicating the payment history associated with the account of the subscriber, that the subscriber pays fees associated with the account by a time limit associated with the account;

based on the frequency that the device associated with the subscriber requests attachment to a partner network, a determination that the subscriber exceeds the data limit associated with the service plan selected by the subscriber during each of the plurality of periods of time, and a determination that the subscriber pays fees associated with the account by the time limit associated with the account, sending, by the service personalization engine, a subscription update offer to the device associated with the subscriber;

receiving, by the service personalization engine, from the device associated with the subscriber, in response to the subscription update offer, a response message, the response message declining the subscription update offer; and in response to the response message declining the subscription update offer,
  generating, by the service personalization engine, a confirmation message, and
  sending, by the service personalization engine, the confirmation message to the device associated with the subscriber, wherein the confirmation message confirms that the subscriber accepts the subscription update offer.

10. The method of claim 9, wherein the subscription update offer comprises an up-sell offer.

11. The method of claim 9, wherein the subscription update offer comprises a down-sell offer.

12. The method of claim 9, wherein the subscription update offer comprises a cross-sell offer.

13. The method of claim 9, wherein the subscription update offer comprises a data subscription update offer.

14. A method comprising:

receiving, by a service personalization engine, historical data usage information associated with a subscriber and information indicating a payment history associated with an account of the subscriber, the historical data usage information indicating an amount of data, provided via a wireless communication network, that is accessed by the subscriber over each of a plurality of periods of time;

intercepting, by a network entity, messages from a signal transfer point;

detecting, by the network entity, from the messages, which network a device is attempting to attach to;

providing, by the network entity, to the service personalization engine, roaming information based on detecting to which network the device is attempting to attach;

receiving, by an input and output device of the service personalization engine, from the network entity, the roaming information indicating a frequency that the device associated with the subscriber requests attachment to a partner network;

determining, by the service personalization engine, based at least on the historical data usage information, that the subscriber exceeds, during each of the plurality of periods of time, a data limit associated with a service plan selected by the subscriber;

determining, by the service personalization engine, based at least on the information indicating the payment history associated with the account of the subscriber, that the subscriber pays fees associated with the account by a time limit associated with the account; and based on the frequency that the device associated with the subscriber requests attachment to a partner network, a determination that the subscriber exceeds the data limit associated with the service plan selected by the subscriber during each of the plurality of periods of time, and a determination that the subscriber pays fees associated with the account by the time limit associated with the account, sending, by the service personalization engine, a subscription update offer to the device associated with the subscriber.

15. The method of claim 14, wherein the subscription update offer comprises an up-sell offer.

16. The method of claim 14, wherein the subscription update offer comprises a down-sell offer.

17. The method of claim 14, wherein the subscription update offer comprises a cross-sell offer.

18. The method of claim 14, wherein the subscription update offer comprises a data subscription update offer.

19. The method of claim 14, further comprising:

receiving, from the device associated with the subscriber, a response to the subscription update offer, wherein the response accepts the subscription update offer; and in response to the response accepting the subscription update offer,
  generating a confirmation message, and
  sending the confirmation message to the device associated with the subscriber, wherein the confirmation message confirms that the subscriber accepts the subscription update offer.

20. The method of claim 19, wherein the confirmation message comprises an amended service agreement for acceptance by the subscriber.

21. The method of claim 19, further comprising provisioning, for the subscriber, an upgraded service associated with the subscription update offer.

* * * * *